(12) United States Patent  
Chandrasekaran et al.

(10) Patent No.: US 9,021,143 B2  
(45) Date of Patent: Apr. 28, 2015

(54) POLLING OF I/O DEVICES ON HOST INITIATED COMMUNICATION TRANSPORTS

(71) Applicant: Intel Corporation, Santa Clara, CA (US)

(72) Inventors: Moulishankar Mouli Chandrasekaran, Folsom, CA (US); John J. Valavi, Hillsboro, OR (US); James R. Trethewey, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 180 days.

(21) Appl. No.: 13/690,448

(22) Filed: Nov. 30, 2012

(65) Prior Publication Data

US 2014/0156871 A1  Jun. 5, 2014

(51) Int. Cl.
*G06F 3/00* (2006.01)
*G06F 13/10* (2006.01)
*G06F 13/24* (2006.01)
*G06F 13/22* (2006.01)

(52) U.S. Cl.
CPC .............. *G06F 13/102* (2013.01); *G06F 13/24* (2013.01); *G06F 13/22* (2013.01)

(58) Field of Classification Search
CPC ........ G06F 13/22; G06F 13/24; G06F 13/102
USPC ....................................................... 710/5, 18
See application file for complete search history.

(56) References Cited

U.S. PATENT DOCUMENTS

| 6,085,265 | A | 7/2000 | Kou |
| 6,101,550 | A | 8/2000 | Zucker |
| 6,263,395 | B1 | 7/2001 | Ferguson et al. |
| 6,356,969 | B1 | 3/2002 | DeKoning et al. |
| 6,466,998 | B1 | 10/2002 | Bennett |
| 6,467,008 | B1 | 10/2002 | Gentry, Jr. et al. |
| 6,615,288 | B1 | 9/2003 | Herzi |
| 6,738,048 | B1 * | 5/2004 | Rundel ......................... 345/173 |
| 6,898,651 | B2 | 5/2005 | Wang et al. |
| 6,990,542 | B2 | 1/2006 | Nguyen |
| 7,028,124 | B2 | 4/2006 | Leete et al. |
| 7,039,205 | B1 | 5/2006 | Carter et al. |
| 7,043,729 | B2 | 5/2006 | Lewis |
| 7,054,972 | B2 | 5/2006 | Parry et al. |
| 7,054,975 | B2 | 5/2006 | Tjia |
| 7,073,006 | B2 | 7/2006 | Nguyen |
| 7,149,832 | B2 | 12/2006 | Wieland et al. |
| 7,249,211 | B2 | 7/2007 | Wieland et al. |

(Continued)

*Primary Examiner* — Eric Oberly  
(74) *Attorney, Agent, or Firm* — Trop, Pruner & Hu, P.C.

(57) ABSTRACT

A disclosed data processing system includes a processor and an operating system kernel that includes communication drivers to support sideband interrupt deferring of polling associated with I/O requests. The communication drivers may implement a driver stack that includes a sideband miniport driver to detect an application program read request for device data from an input/output (I/O) device. The I/O device may be a sensor or another type of human interface device. The sideband miniport driver may pend the read request and maintain an interrupt pipe of a communication transport between the host system and the I/O device in a disabled state. With the interrupt pipe disabled, the host system drivers are unable to poll the I/O device. The sideband miniport driver may pend the read request and keep the interrupt pipe disabled until a sideband interrupt is communicated to the sideband miniport driver.

20 Claims, 5 Drawing Sheets

(56) References Cited

U.S. PATENT DOCUMENTS

| | | |
|---|---|---|
| 7,281,074 B2 | 10/2007 | Diefenbaugh et al. |
| 7,363,407 B2 | 4/2008 | Oshins |
| 7,546,409 B2 * | 6/2009 | Gough et al. .................. 710/313 |
| 7,657,684 B2 | 2/2010 | Guo et al. |
| 7,680,973 B2 | 3/2010 | Goldstein et al. |
| 7,689,747 B2 | 3/2010 | Vega et al. |
| 7,978,357 B2 | 7/2011 | Briggs et al. |
| 2003/0028697 A1 | 2/2003 | Nguyen |
| 2003/0033469 A1 | 2/2003 | Tjia |
| 2003/0061424 A1 | 3/2003 | Leete |
| 2003/0212844 A1 | 11/2003 | Wang et al. |
| 2004/0031034 A1 | 2/2004 | Lewis |
| 2004/0117534 A1 | 6/2004 | Parry et al. |
| 2004/0210698 A1 | 10/2004 | Nguyen |
| 2005/0071531 A1 | 3/2005 | Oshins |
| 2005/0228917 A1 | 10/2005 | Brink et al. |
| 2006/0117325 A1 | 6/2006 | Wieland et al. |
| 2006/0218328 A1 | 9/2006 | Vega et al. |
| 2007/0005859 A1 | 1/2007 | Diefenbaugh et al. |
| 2007/0088890 A1 | 4/2007 | Wieland et al. |
| 2007/0177190 A1 | 8/2007 | Briggs et al. |
| 2007/0255877 A1 | 11/2007 | Guo et al. |
| 2008/0028113 A1 * | 1/2008 | Guo et al. ..................... 710/104 |
| 2008/0307140 A1 * | 12/2008 | Goldstein et al. ............. 710/260 |
| 2011/0153914 A1 | 6/2011 | Huffman et al. |
| 2012/0026202 A1 | 2/2012 | Maciesowicz et al. |

* cited by examiner

POLLING OF I/O DEVICES ON HOST INITIATED COMMUNICATION TRANSPORTS

FIELD

Disclosed subject matter is in the field of microprocessor-based systems and, more particularly, systems that include polled input/output devices.

BACKGROUND

Computers and other microprocessor based systems and devices often include input/output (I/O) devices that communicate data to and/or from the host system or device. The transport protocol by which an I/O device communicates information may, at times, consume power without providing a functional benefit to the device. Some I/O bus protocols, for example, employ host-based polling of the I/O device to initiate data transfers and the polling may occur continuously and indefinitely, regardless of whether an exchange of data between the I/O device and the system is pending.

DETAILED DESCRIPTION

Figure 1:
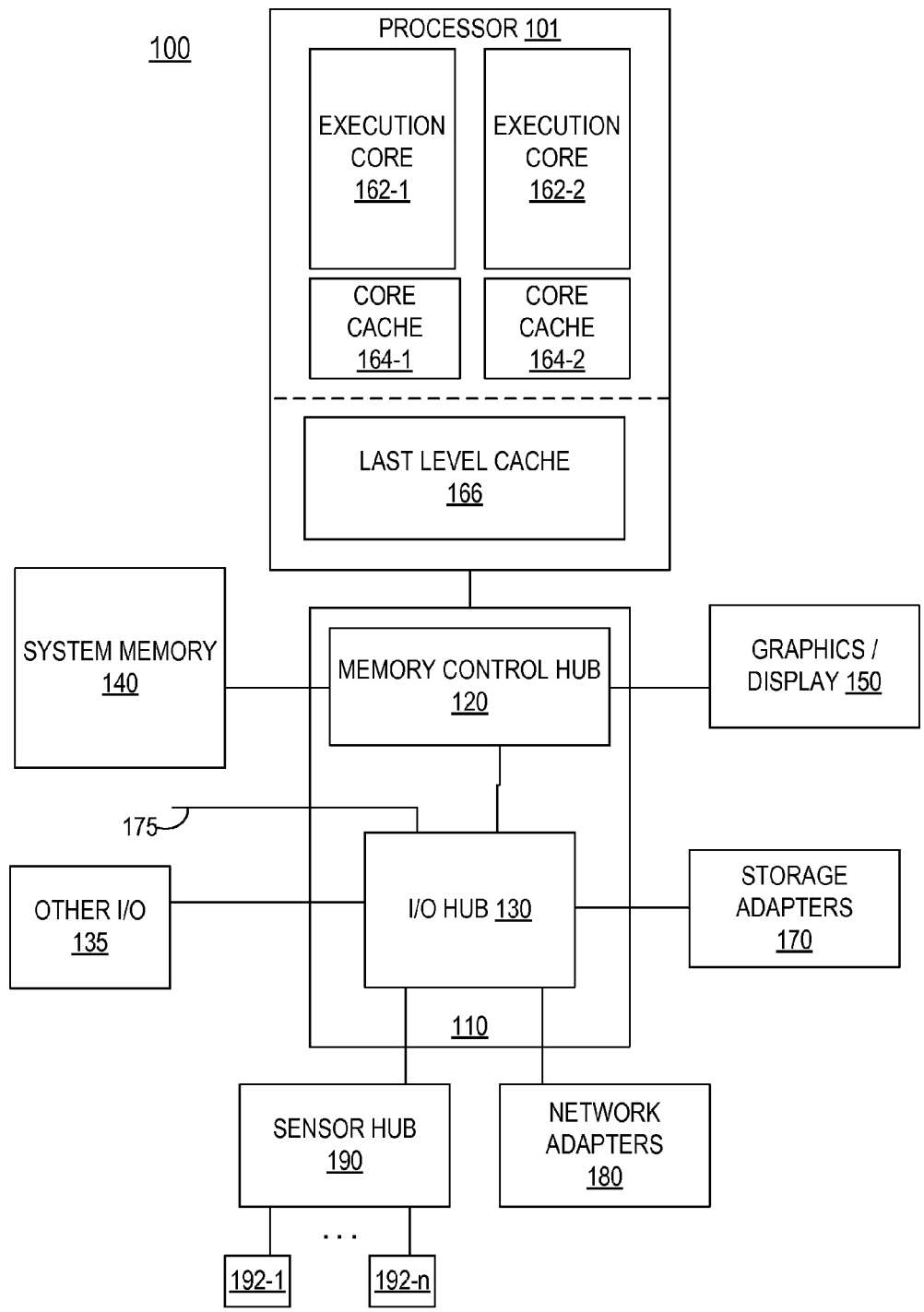
FIG. 1 illustrates a microprocessor based system used in conjunction with at least one embodiment that supports sideband interrupt deferring.

In at least one embodiment, a disclosed data processing system, also referred to herein as a host system, includes a processor and an operating system kernel that includes communication drivers to support sideband interrupt deferring of polling by a host driver of a sensor or other type of human interface device (HID). The operating system kernel may be stored in a persistent or volatile computer readable storage medium that is accessible to the processor. In at least one embodiment, the operating system kernel stores communication driver instructions that, when executed by the processor, implement a driver stack for an I/O communication transport protocol.

In at least one embodiment, the driver stack includes sideband miniport instructions that, when executed by the processor, cause the processor to perform operations collectively referred to herein as a sideband miniport driver. The sideband miniport driver detects a read request, initiated by an application program, to read data from an I/O device. In at least one embodiment, the I/O device is a sensor or another type of HID.

In at least one embodiment, the sideband miniport driver responds to detecting the read request by pending the read request and maintaining an interrupt pipe between the host system and the I/O device in a disabled state. With the interrupt pipe disabled, the host system drivers may be unable to poll the I/O device to initiate an interrupt. In at least one embodiment, the sideband miniport driver is tightly coupled to a corresponding function class driver. The function class driver may lack direct support for communicating an out-of-band signal such as the sideband interrupt signal.

In at least one embodiment, the sideband miniport driver may pend the read request and keep the interrupt pipe disabled until an interrupt that is communicated out-of-band with respect to the communication channel between the host system and the I/O device is detected by the sideband miniport driver. The interrupt that is communicated out-of-band is referred to herein as a sideband interrupt signal.

In at least one embodiment, the sideband interrupt signal indicates that read data from the I/O device associated with the read request is available for retrieval by the host system. In at least one embodiment, the sideband miniport driver responds to detecting the sideband interrupt by issuing a start command. The start command, in at least one embodiment, enables the interrupt pipe between the host system and the I/O device. When the interrupt pipe is established, the host system may poll the I/O device to initiate transfer of the data. The driver stack may monitor the progress of the data transfer and, upon detecting transfer of the entire data to complete the read request, disables the interrupt pipe after the sideband interrupt signal is de-asserted.

In at least one embodiment, the sideband interrupt may be beneficially employed in environments that feature host-initiated communication transport protocols including, as an example, the universal serial bus (USB). In a host-initiated communication transport protocol, a host controller initiates all bus transactions. In these embodiments, the sideband interrupt provides a signal by which the sideband miniport driver can enable and disable an interrupt pipe or other form of communication connection.

In at least one embodiment that communicates with the I/O device over a universal serial bus, the sideband interrupt driver may be implemented with a general purpose I/O (GPIO) resource of an I/O controller hub. In at least one embodiment, the I/O controller hub may route the interrupt signal to a configuration driver of the host system kernel that produces a intermediate signal indicative of the interrupt signal. The configuration driver may condition the interrupt signal for delivery and detection by the sideband miniport driver. For example, the configuration driver may condition the voltage or timing of the signal. In addition, the configuration driver may impose additional logical constraints or criteria on the generation of a sideband interrupt signal. For example, the configuration driver may suspend sideband interrupt deferring under specific conditions.

In at least one embodiment, disclosed subject matter is implemented as a method for employing a sideband interrupt signal to implement read-demand polling for a sensor or other form of HID on a host-initiated communication transport. In at least one embodiment, a read request from an application program is detected by a sideband miniport driver. In at least one embodiment, the read request requests device data from a sensor or HID. The sideband miniport driver responds to detecting the read request by pending the read request and maintaining an interrupt pipe between a host system and the I/O device in a disabled state. With the interrupt pipe disabled, the driver stack is prevented from polling the peripheral device.

Eventually, the I/O device will retrieve or otherwise obtain the read data and respond by asserting a data ready signal that may be implemented as a GPIO interrupt on an I/O hub controller. In at least one embodiment, the GPIO interrupt may be routed through an intermediate driver for conditioning or formatting before delivery to a sideband miniport driver. The intermediate driver may be a configuration driver such as an advanced configuration and power interface (ACPI). When the sideband miniport driver for the sensor device detects the assertion of the sideband interrupt signal, the sideband miniport driver may then issue a start command that results in the interrupt pipe being initiated. When the interrupt pipe is initiated, the driver stack may then poll the I/O device for the read data and provide the read data to the requestor.

Turning now to the drawings, FIG. 1 illustrates one embodiment of a data processing system 100. The FIG. 1 embodiment of system 100 includes a processor 101 and a chipset 110 that includes a memory controller hub 120 and an I/O hub 130. Memory controller hub 120 provides an interface between processor 101 and system memory 140 as well as an interface between processor 101 and a graphics adapter/display 150.

The FIG. 1 embodiment of processor 101 includes one or more execution cores 162, two of which are depicted as execution cores 162-1 and 162-2. The FIG. 1 embodiment of processor 101 further includes core cache memories 164-1 and 164-2 and a last level cache 166 that is shared by execution cores 162. Other embodiments may include more or fewer layers of cache memories. Similarly, although the FIG. 1 embodiment of processor 101 and system 100 depicts certain functions including the memory control function as being implemented in the chipset 110 that is physically distinct and separate from processor 101, other embodiments may integrate one or more chipset functions into processor 101. For example, memory controller hub 120 may, in other embodiments, be integrated as an element of processor 101.

The FIG. 1 embodiment I/O hub 130 includes support for various adapters, transports, and protocols including storage adapters 170, network adapters 180, sensor hubs 190 and other I/O 135. These various interfaces and protocols may include, as examples, a USB interface, an I2C interface, a PCI express interface, legacy PCI buses, as well as various storage interfaces including ATA, SATA, and SCSI. I/O hub 130 may further support various serial bus interfaces including, as an example, a general purpose I/O (GPIO) 175. The resources identified as other I/O 135 encompass various legacy and other types of I/O including, as examples, keyboards, mice, serial I/O, audio, and so forth.

I/O hub 130 interfaces with storage adapters 170 to support various storage technologies including magnetic storage such as a hard disk drive (HDD), and a persistent, randomly accessible storage technology such as a solid state drive. In at least one embodiment, I/O hub 130 interfaces with network adapters 180 depicted in FIG. 1, which encompass various wireline and wireless network interfaces. Network adapters 180 may include, as examples, a network interface controller (NIC) operable to interface system 100 with an Internet protocol network, a wireless transceiver adapter operable to interface system 100 with a IEEE 802.11 (Wi-Fi) wireless network, as well as any radio frequency transceiver operable to interface system 100 with a wireless telephony network.

The sensor hub 190 interfaces a number of sensors 192-1 through 192-n to I/O hub 130 and processor 101. Sensors 192 are examples of HIDs that enable interaction between humans and system 100. Although the sideband deferring mechanism described herein is illustrated with respect to an implementation of system 100 emphasizing sensors 192 as the HID device to which the sideband deferring mechanism is applied, it will be appreciated that other embodiments of system 100 may employee sideband interrupt deferring in conjunction with other types of human interface devices. Sensors 192 may include, as examples, a magnetometer, a global positioning special (GPS) receiver, and a real-time clock, an ambient light sensor, and other sensors.

Figure 2:
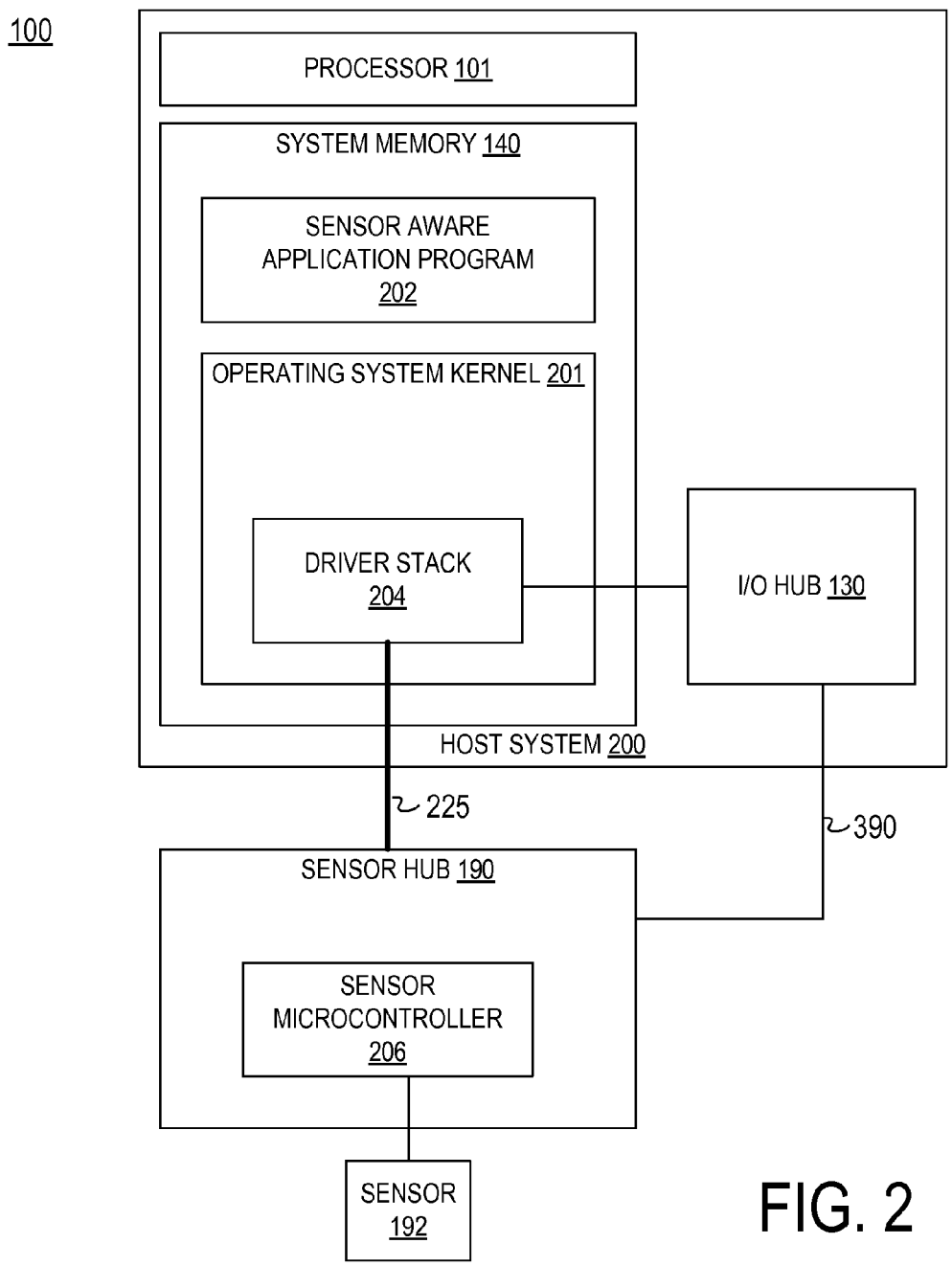
FIG. 2 illustrates features of the FIG. 1 system used in conjunction with at least one embodiment.

Referring now to FIG. 2, elements of one embodiment of system 100 are illustrated to emphasize sideband interrupt deferring mechanism features of system 100. The FIG. 2 embodiment illustrates system 100 as including various resources and features, some of which may be implemented in hardware and microcode while others may be implemented as firmware or software. Firmware and software features may be implemented as instructions stored in system memory 140 (FIG. 1) or storage adapters 170 (FIG. 1) that, when executed by processor 101, cause the processor to perform various operations described herein.

The elements of system 100 illustrated in FIG. 2 include a sensor 192 coupled to a sensor hub microcontroller 206 of sensor hub 190. Sensor hub 190 communicates with a driver stack 204 of an operating system kernel 201 stored in system memory 140 along with a sensor aware application program 202. As suggested by its name, sensor aware application program 202 may be an application program that utilizes sensor 192 as part of the functionality provided by application program 202. A street map application for example, may access a sensor in the form of a GPS receiver.

The FIG. 2 embodiment of system 100 depicts a communication bus 225 between sensor hub 190 and driver stack 204 of host system 200, a sideband interrupt signal 390 from sensor hub 190 to I/O hub 130, and a intermediate interrupt signal 393 from I/O hub 130 to driver stack 204.

Sensor aware application program 202 includes or may include application programming interfaces (APIs) that expose driver stack 204 to the application program. Driver stack 204 may include one or more drivers that make up the driver stack. Drivers and driver stacks facilitate communication between applications programs executing under operating system kernel 201 and I/O devices complying with various communication protocols, also sometimes referred to as communication transports. If, as an example, a sensor is implemented as a USB compliant sensor, driver stack 204 may include one or more USB sensor class drivers, USB HID drivers, USB bus class drivers, and USB host controllers.

Sensor hub microcontroller 206 is depicted implemented within sensor hub 190 and may include firmware to interact directly with the sensor hardware, as well as to provide logical abstractions of the sensors themselves, possibly in compliance with a standardized protocol or specification. For example, in the context of sensors and USB applications, sensor hub microcontroller 206 may provide logical abstractions of sensor devices where the logical abstractions are compatible with an HID USB device class specification. The USB specification includes, as an example, an HID class that specifies a device class for human interface devices including, in addition to sensors, more traditional I/O devices such as keyboards, mice, game controllers, touch pads, touch screens, and so forth.

USB is a pervasive interconnect technology and an enormous number of USB drivers exist for many different operating systems. Although many characteristics of the USB are top-notch, its impact on platform power consumption has been less than stellar. Although power consumption was not a primary criterion of its original design in the mid 1990s, USB has become a de facto feature for battery-powered platforms where low-power is paramount. See, e.g., B. Cooper et alia "Making USB a More Energy Efficient Interconnect" Intel Technology Journal, v. 12 no. 01221/2008. Many power consumption issues exhibited by USB devices can be attributed to a USB architecture that constantly polls the I/O devices. This polling may continue indefinitely regardless of whether any data is awaiting. Id. It is this aspect of USB that has led some to remark that USB often works quite hard at doing nothing. Id, p. 2. Page 18. The sideband deferring mechanism described herein addresses undesirable power consumption attributable to USB polling.

Figure 3:
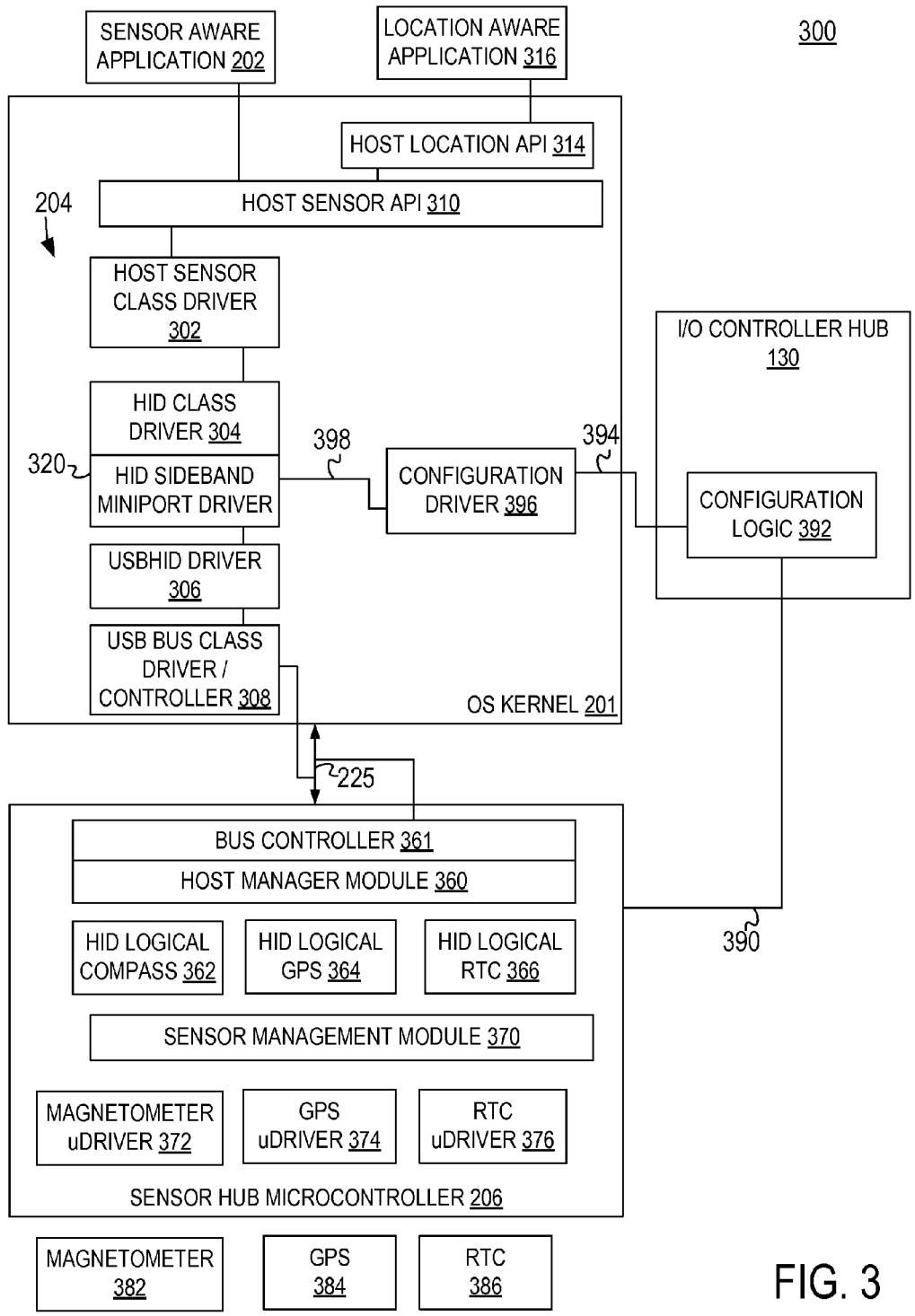
FIG. 3 illustrates elements of the FIG. 1 system used in conjunction with at least one embodiment.

Referring to FIG. 3, selected elements of one embodiment of an I/O communication architecture 300 suitable for inclusion in data processing system 100 (FIG. 1) are illustrated. The FIG. 3 embodiment of I/O communication architecture 300 includes elements to reduce power consumption attributable to I/O device polling by a host controller of a host-initiated bus. The depicted embodiment of I/O communication architecture 300 is suitable for use in an environment in which drivers provided as part of an operating system kernel or driver stack may not directly support sideband interrupts.

The FIG. 3 embodiment of sensor communication architecture 300 includes elements to implement sideband interrupt deferring to control the polling behavior of a USB driver stack, resulting in reduced power consumption and increased battery life. Although the FIG. 3 embodiment of sensor architecture 300 illustrates a driver stack for a USB-compliant HID, other embodiments may employ analogous techniques in conjunction with any host-initiated communication transport that relies on host controller polling of I/O devices. In addition, although the depicted embodiment is described with respect to certain HID sensors, the sideband interrupt deferring described may be employed more generally to many HIDs including, but not limited to touch screens.

The FIG. 3 embodiment of sensor communication architecture 300 depicted in FIG. 3 includes features including the use of a single sideband interrupt signal 390 generated by a sensor hub microcontroller 206. In the FIG. 3 embodiment, all HID devices share the single sideband interrupt signal 390 to a kernel driver referred to herein as the HID sideband miniport driver 320.

The FIG. 3 embodiment of sensor communication architecture 300 also employs sideband miniport driver (320) to implement on-demand enabling of the USB interrupt pipe where "demand" is indicated when a sideband interrupt is received. When sideband miniport driver 320 detects the sideband interrupt signal, the FIG. 3 embodiment of driver stack 204 enables the interrupt pipe, polls the I/O device to fill a read buffer, completes the applicable read request to a sensor class driver, and then disables the USB interrupt pipe to prevent further polling.

In a conventional USB architecture employing an extensible host controller interface (EHCI) or other type of host controller, an application that wants to read data from an HID might request a device instance of a class driver to read from a particular HID. The device instance may post a read buffer to a USB bus class driver. The USB bus class driver may then call the USB device for data. If no data is available in the HID hardware, the USB bus class driver may continue to poll indefinitely. The FIG. 3 embodiment of sensor communication architecture 300 addresses unwanted polling by implementing suspending polling until the I/O device firmware indicates demand, i.e., a need to have the host controller read data, by asserting the sideband interrupt. By preventing the posting of read commands until the requested data is readily available in the HID, disclosed embodiments may reduce the amount of polling performed by the host controller and thereby reduce the power consumption associated with polling.

The depicted embodiment of sensor communication architecture 300 includes a dedicated sensor hub microcontroller 206 that implements sideband interrupt deferring with a GPIO signal. Because the sideband interrupt deferring prevents the host USB bus driver from issuing read requests in the absence of available data at the sensor hub as described below, the sensor hub microcontroller 206 may be beneficially transitioned to a reduced power state for a greater greater percentage of time.

The FIG. 3 embodiment of sensor communication architecture 300 illustrates a driver stack 204 of an operating system kernel 201, a sensor hub microcontroller 206, and a universal serial bus 225 connected between the two. The FIG. 3 embodiment of driver stack 204 includes a host sensor class driver 302 in communication with an HID class driver 304. A sideband miniport driver referred to herein as HID sideband miniport driver 320 communicates with HID class driver 304. A USB HID driver 306 and a USB bus class driver/controller 308 provide a host controller for USB 225.

The sensor hub microcontroller 206 embodiment depicted in FIG. 3 includes a host management module 360 that receives information from HID logical devices including, in the depicted embodiment, a logical compass 362, a logical GPS receiver 364, and a logical real-time clock 366. A sensor management module 370 receives packets from micro drivers corresponding to the individual hardware sensors.

The FIG. 3 embodiment of sensor communication architecture 300 includes three sensors, namely, magnetometer 382, GPS radio hardware 384, and real-time clock hardware's 386. The hardware sensors 382, 384, and 386 may be implemented as integrated circuits or chips or as hardware or logic on sensor hub microcontroller 206. The FIG. 3 embodiment of sensor manager module 370 is illustrated receiving information from a magnetometer microdriver 372, a GPS microdriver 374, and a real-time clock microdriver 376. In the FIG. 3 embodiment, sensor hub microcontroller 206 is directly connected to sensor hardware including magnetometer 382, GPS radio hardware 384, and real-time clock hardware 386. A connection bus (not explicitly depicted) for connecting sensor hardware to sensor hub microcontroller 206 may include, but is not limited to, an I2C bus, a UART, an SPI bus, a PCI, or a PCI Express bus.

Sensor communication architecture 300 as illustrated in FIG. 3 beneficially implements a sideband interrupt deferring mechanism that includes a sideband interrupt signal 390 generated by sensor hub microcontroller 206. Sideband interrupt signal 390 is provided to configuration logic 392 shown as being located on I/O controller hub 130. In at least one embodiment, configuration logic 392 generates an intermediate interrupt signal 394 based on sideband interrupt signal 390. In the FIG. 3 embodiment, intermediate interrupt signal 394 is received by a configuration driver 396 in operating system kernel 201. Configuration driver 396 generates a sideband interrupt deferring signal 398 based on intermediate interrupt signal 394 and sideband interrupt deferring signal 398 is provided to HID sideband miniport driver 320.

Operation of the FIG. 3 embodiment of driver stack 204 will now be described. Functionality of interest begins when an application program represented by sensor aware application program 202 wants to read data from sensor hardware and sends a read request to host sensor class driver 302 via host Sensor API 310. A host sensor class driver 302 posts a read buffer to HID class driver 304. HID class driver 304 is associated with a miniport driver referred to herein as HID sideband miniport driver 320.

When the HID sideband miniport driver 320 detects the read request posted to HID class driver 304, HID sideband miniport driver 320 pends the read request and refrains from unlocking or otherwise enabling an interrupt pipeline of USB bus class driver/controller 308, but instead enters a waiting state in which it monitors sideband interrupt deferring signal 398.

Eventually, the sensor data requested by sensor aware application 202 is provided to a host manager module 360 of sensor microcontroller 206, which signals a USB bus controller 361 that the requested data is ready to be read by the host controller and asserts sideband interrupt signal 390. In the FIG. 3 embodiment, sideband interrupt signal 390 is provided to configuration logic 392, which resides on I/O controller hub 130. In this embodiment, I/O controller hub 130 may support the system's configuration and power management resources. Moreover, I/O controller hub 130 may provide support and resources for a general purpose I/O (GPIO) signal. In at least one embodiment, the sensor communication architecture 300 depicted in FIG. 3 employees a single GPIO interrupt to provide a sideband interrupt that indicates a polling demand signal for all sensor and/or HID hardware in the system.

In the FIG. 3 embodiment, the sideband interrupt signal 390 generated by microcontroller 206 is sent to configuration logic 392 on I/O controller hub 130. The configuration of logic 392 generates intermediate interrupt signal 394 that is routed to a configuration driver 396. Configuration logic 392 may implement various aspects of standardized power and configuration management protocols including, as examples, ACPI and the GNU Palmtop Environment (GPE) protocol.

In the FIG. 3 embodiment of sensor communication architecture 300, HID sideband miniport driver 320 receives a sideband interrupt deferring signal 398 from configuration driver 396. Configuration driver 396 may implement power management and configuration policies of ACPI or another suitable protocol. In the FIG. 3 embodiment, configuration driver 396 generates sideband interrupt deferring signal 398 based on intermediate interrupt signal 394 and, possibly, other configuration and power management signals. For example, configuration driver 396 may maintain sideband interrupt deferring signal 398 in a deasserted state during times when system 100 is in a reduced power state.

In the described manner, sensor communication architecture 300 asserts sideband interrupt deferring signal 398 only after the requested data has arrived at bus controller 361 and is therefore ready to be read by the host operating system. Moreover, sensor communication architecture 300 de-asserts sideband interrupt deferring signal 398 as soon as the requested data has been read by the host and provided to the requesting application program.

In the FIG. 3 embodiment, sideband interrupt deferring signal 398 generated by configuration driver 396 is sent directly to HID sideband miniport driver 320. Upon detecting the assertion of sideband interrupt deferring signal 398, HID sideband miniport driver 320 sends a start command to USB HID driver 306 and to USB bus class driver/controller 308. In the depicted embodiment, USB bus class driver/controller 308 incorporates an EHCI controller. Other embodiments may implement the bus class driver with other host controller interfaces. USB bus class driver/controller 308, upon receiving the start command from HID sideband miniport driver 320, enables the interrupt pipe for the USB stack and holds the USB device controller in sensor hub microcontroller 206 for data.

Because the sideband interrupt deferring signal 398 was deferred pending delivery of the sensor data to the USB controller 361, the sensor data is available immediately when USB bus class driver/controller 308 polls the USB controller 361. USB bus class driver/controller 308 and HID sideband miniport driver 320, in conjunction with HID class driver 304, then fills the read buffer of host sensor class driver 302.

After the read buffer is completed, HID sideband miniport driver 320 sends a stop command to USB HID driver 306 if it sees the status of side band interrupt is de-asserted thru configuration driver and no more data to be read. USB bus class driver/controller 308 disables the interrupt pipe for the USB stack and thereby stops any further polling of the USB controller driver. Host sensor class driver 302 returns the read data received from the HID USB driver stack to sensor API aware application 202. When the read is completed on the USB bus, the sensor hub microcontroller firmware may deassert the sideband interrupt signal 390.

Referring back to the depicted embodiment of sensor of microcontroller 206, the sensor manager module 370 may support synchronous as well as asynchronous transmission of sensor data. Asynchronous transmission may be controlled or defined by programs policies including, as examples, a time interval or a threshold repeated criteria.

In at least one embodiment, synchronous reads by sensor manager module 370 are not completed by asserting the sideband interrupt signal 390. The embodiment of driver stack 204 depicted in FIG. 3 may support the use of HID input reports that may be sent to operating system kernel 201. These HID input reports may be routed on the basis of the HID top level collections described in an HID report descriptor written by the sensor hub.

Although the description of the operation of sensor communication architecture 300 focused on the sensor API aware application 202, FIG. 3 further illustrates resources that would enable the system to interface with a location aware application through location aware application 316 using host location API 314 as a bridge to host sensor API 310.

As suggested previously, the sensor hub microcontroller 206 illustrated in FIG. 3 interfaces exclusively with sensor hardware devices, but sensor hub microcontroller 206 can be generalized to encompass, in addition to sensor hardware, HID hardware including as an example, a touchscreen.

Figure 4:
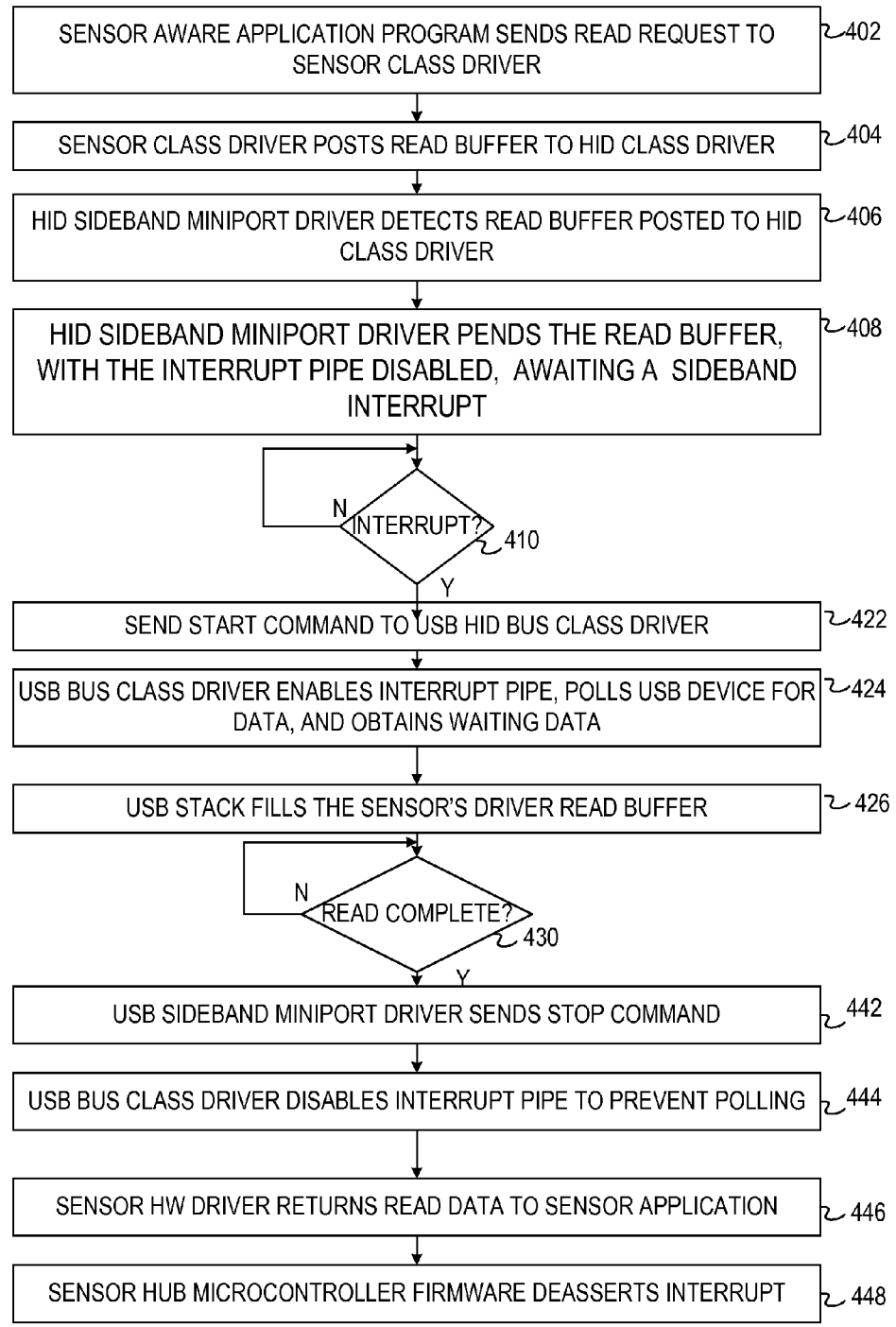
FIG. 4 illustrates one embodiment of a sideband interrupt deferring method according to one embodiment.

Referring now to FIG. 4, selected elements of at least one embodiment of a method 400 for implementing a sideband interrupt to support read demand polling in a sensor architecture are depicted. In the depicted embodiment, method 400 includes a sensor aware application program sending (operation 201) a read request to a sensor class driver. The sensor class driver posts (operation 404) a read buffer to an HID class driver. An HID sideband miniport driver then detects (operation 406) receipt of the read buffer by the HID class driver and pends (operation 408) the read buffer, by maintaining the interrupt pipe in a disabled state, awaiting the arrival of a sideband interrupt.

The depicted embodiment of method 400 monitors (operation 410) for receipt of the interrupt by the HID sideband miniport driver and, when an interrupt is received, the HID sideband miniport driver 201 sends (operation 422) a start command to a USB HID bus class driver.

The depicted embodiment of method 400 then enables (operation 424) an interrupt pipe, polls the USB device for data, and obtains the data that is awaiting in the sensor hardware microcontroller. The USB stack then fills (operation 426) the sensor's driver with the read data. The depicted embodiment of method 400 then monitors (operation 430) for completion of the read operation and, when the read operation completes, the USB sideband miniport driver then sends operation 442) a stop command and the bus class driver disables (operation 444) the interrupt pipe to prevent any further polling of the sensor microcontroller. The sensor hardware driver then returns the read data to the sensor application (446) and the sensor hub microcontroller firmware then de-asserts the interrupt (operation 448).

Figure 5:
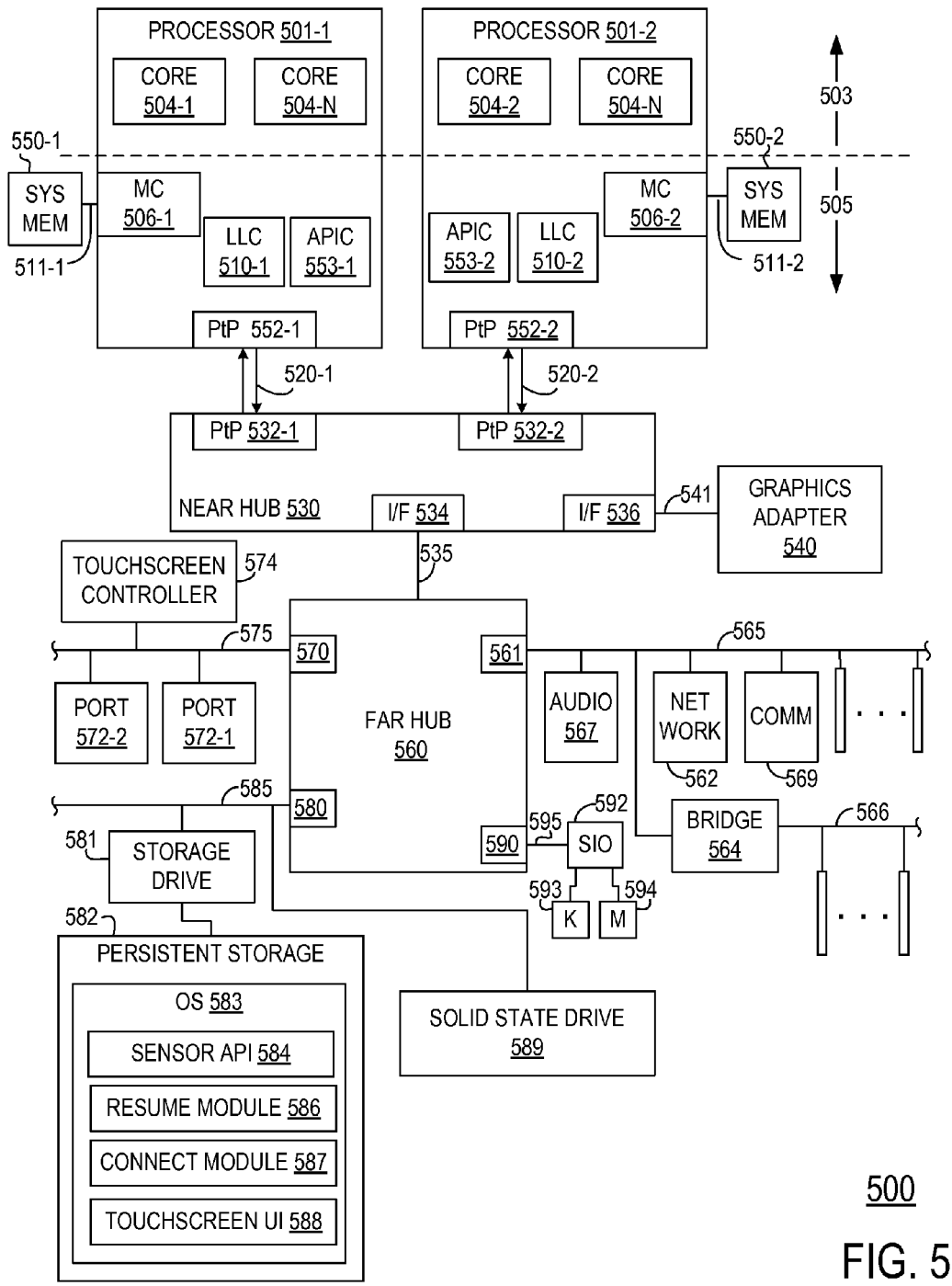
FIG. 5 illustrates a microprocessor based system used in conjunction with at least one embodiment.

Referring now to FIG. 5, a block diagram depicts selected elements of at least one embodiment of a multiprocessor system platform 500 that may employ sideband interrupt deferring as described above. The FIG. 5 embodiment of system includes a first processor 501-1, a second processor 501-2, and an I/O hub referred to herein as near hub 530. Near hub 530 communicates with processor 501-1 over a point-to-point interconnect 520-1 connected between a point-to-point interface 532-1 of near hub 530 and a point-to-point interface 552-1 of processor 501-1. Similarly, near hub 530 communicates with processor 501-2 via point-to-point interconnect 520-2 between point-to-point interface 532-2 of near hub 530 and point-to-point interface 552-2 of processor 501-2. In the FIG. 3 embodiment, near hub 530 also includes a graphics interface 536 to communicate with a graphics adapter 540 over a dedicated graphics bus 541, which may be a PCI Express or other suitable type of interconnection. Multiprocessor system platform 500 may further include a point-to-point interconnect (not depicted) between processor 501-1 and processor 501-2. The point-to-point interconnects 520 depicted in FIG. 5 include a pair of uni-directional interconnections with one of the interconnections communicating data from the applicable processor 501 to near hub 530 and the other interconnection communicating data from near hub 530 to the processor 501.

The FIG. 5 processors 501 may be described as including a core portion 503 and an uncore portion 505. The core portions 503 of the FIG. 5 processors 501 include multiple processor cores, referred to herein simply as cores 504-1 through 504-n. Each core 504 may include logic implemented in hardware, firmware, or a combination thereof that provides, as examples, an execution pipeline suitable for fetching, interpreting, and executing instructions and storing or otherwise processing results of those instructions. Uncore portions 505 of the FIG. 5 processors 501 may include a system memory controller (MC) 506, a cache memory referred to herein as the last level cache 510, and an interrupt controller 553. Each system memory interface 506 may perform various memory controller functions. Last level cache 510 may be shared among each of the cores 504 of processor 501.

The FIG. 5 multiprocessor system platform 500 employs a distributed or non-uniform system memory architecture in which the system memory as a whole is implemented as a plurality of system memory portions 550 with each system memory portion 550 being directly connected to a processor 501 via a corresponding memory interconnect 511 and system memory controller 506. In this distributed memory configuration, each processor 501 may interface directly with its corresponding system memory portion 550 via its local system memory controller 506. In addition, any processor, e.g., processor 501-1, may read from or write to a memory portion, e.g., system memory portion 550-2 associated with a different processor, e.g., processor 501-2, but the originating processing may need to go through one or more point-to-point interconnects 520 to do so. Similarly, the last level cache 510 of each processor 501 may cache data from its own processor's system memory portion 550 or from another processor's system memory portion.

Although FIG. 5 depicts a distributed memory configuration, other embodiments may employ a uniform memory architecture in which, for example, the entire system memory is connected to a memory controller implemented in near hub 530 rather than having multiple system memory portions 550, each connected to a corresponding processor-specific memory controller 506 implemented in the uncores 505 of each processor 501. Such a system is described below with respect to FIG. 5. Moreover, although FIG. 5 depicts a point-to-point configuration in which processors 501 communicate with each other and with near hub 530 via dedicated point to point interconnections 520, other embodiments may employ a shared system bus to which each of the processors 501 and near hub 530 is connected.

In the FIG. 5 embodiment of system platform 500, near hub 530 includes an I/O interface 534 to communicate with a far hub 560 over an I/O interconnection 535. Far hub 560 may integrate, within a single device, adapters, controllers, and ports for various interconnection protocols to support different types of I/O devices. The depicted implementation of far hub 560 includes, as an example, an expansion bus controller 561 that supports an expansion bus 565 that complies with PCI, PCI Express, or another suitable bus protocol. Examples of functions that may be provided via expansion bus 565 include a network adapter 562, an audio controller 567, and a communications adapter 569. Network adapter 562 may enable communication with an IEEE 802.11 family or other type of wireless data network, a Gigabit Ethernet or other type of wire line data network, or both. Audio controller 567 may include or support high definition audio codecs. Communications adapter 569 may include or support modems and/or transceivers to provide wireless or wire line telephony capability. Bus controller 561 may further recognize a bus bridge 564 that supports an additional expansion bus 566 where expansion bus 566 and expansion bus 565 have the same protocol or different protocols. Far hub 560 may further include a high bandwidth serial bus controller 570 that provides one or more ports 572 of a USB or other suitable high bandwidth serial bus 575.

The FIG. 5 embodiment of far hub 560 further includes a storage adapter 580 that supports a persistent storage interconnect 585 such as an Integrated Drive Electronics (IDE) interconnect, a Serial ATA interconnect, a SCSI interconnect, or another suitable storage interconnect to a storage drive 581 that controls persistent storage 582. Far hub 560 may further include a Low Pin Count (LPC) controller 590 that provides an LPC bus 595 to connect low bandwidth I/O devices including, as examples, a keyboard 593, a mouse 594, a parallel printer port (not depicted), and an RS232 serial port (not depicted). Multiprocessor system platform 500 as depicted in FIG. 5 employs a Super I/O chip 592 to interface keyboard 593 and mouse 594 with LPC controller 590.

In some embodiments, the sideband interrupt deferring functionality described herein is suitably employed in a system that includes some or all of the features of system platform 500. The FIG. 5 embodiment of system platform 500 emphasizes a computer system that incorporates various features that facilitate handheld or tablet type of operation and other features that facilitate laptop or desktop operation. In addition, the FIG. 5 embodiment of system platform 500 includes features that cooperate to aggressively conserve power while simultaneously reducing latency associated with traditional power conservation states.

The FIG. 5 embodiment of system platform 500 includes an operating system 583 that may be entirely or partially stored in a persistent storage 582. Operating system 583 may include various modules, application programming interfaces, and the like that expose to varying degrees various hardware and software features of system platform 500. The FIG. 5 embodiment of system platform 500 includes, for example, a sensor API 584, a resume module 586, a connect module 587, and a touchscreen user interface 588. System platform 500 as depicted in FIG. 5 may further include various hardware/firm features including a capacitive or resistive touch screen controller 574 and a second source of persistent storage such as a solid state drive (SSD) 589.

Sensor API 584 provides application program access to one or more of the FIG. 2 sensors (not depicted in FIG. 5) that may be included in system platform 500. The resume module 586 may be implemented as software that, when executed, performs operations for reducing latency when transitioning system platform 500 from a power conservation state to an operating state. Resume module 586 may work in conjunction with SSD 589 to reduce the amount of SSD storage required when system platform 500 enters a power conservation mode. Resume module 586 may, for example, flush standby and temporary memory pages before transitioning to a sleep mode. By reducing the amount of system memory space that system platform 500 is required to preserve upon entering a low power state, resume module 586 beneficially reduces the amount of time required to perform the transition from the low power state to an operating state. The connect module 587 may include software instructions that, when executed, perform complementary functions for conserving power while reducing the amount of latency or delay associated with traditional "wake up" sequences. For example, connect module 587 may periodically update certain "dynamic" applications including, as examples, email and social network applications, so that, when system platform 500 wakes from a low power mode, the applications that are often most likely to require refreshing are up to date. The touchscreen user interface 588 supports a touchscreen controller 574 that enables user input via touchscreens traditionally reserved for handheld applications. In the FIG. 5 embodiment, the inclusion of touchscreen support, in conjunction with support for keyboard 593 and mouse 594, enable system platform 500 to provide features traditionally found in dedicated tablet devices as well as features found in dedicated laptop and desktop type systems.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk re-writables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
    an input/output (I/O) hub including a first logic to generate a second interrupt signal responsive to detection of a first interrupt signal received from an input/output (I/O) device coupled to the processor, the first interrupt signal to indicate that read data associated with a read request is available;
    at least one core to:
        detect the read request, initiated by an application program, to read the data from the I/O device;
        pend the read request and maintain an interrupt pipe of a communication transport between the processor and the I/O device in a disabled state;
        issue a start command responsive to detection of the second interrupt signal; and
        enable the interrupt pipe and poll the I/O device for the data responsive to the start command.

2. The processor of claim 1, wherein the I/O device is at least one of a sensor and a human interface device.

3. The processor of claim 1, wherein the I/O device is to communicate with the processor via a host-initiated communication transport in which data transfers are to be initiated by a kernel driver.

4. The processor of claim 3, wherein the host-initiated communication transport is a universal serial bus transport.

5. The processor of claim 1, wherein the processor is to cause a configuration driver responsive to receipt of the second interrupt signal to send a third interrupt signal to a human input device (HID) driver, the HID driver to issue the start command responsive to the third interrupt signal.

6. The processor of claim 5, wherein the configuration driver is to maintain the third interrupt signal in a deasserted state when the processor is in a low power state.

7. The processor of claim 1, wherein the processor further comprises a memory controller.

8. The processor of claim 1, wherein the processor is to receive the first interrupt signal via a sideband channel coupled between the processor and the I/O device.

9. The processor of claim 8, wherein the sideband channel is separate from the communication transport.

10. A non-transitory computer readable storage medium to store instructions, which when executed by a processor, cause the processor to:
    detect a read request, from an application program, to read data from an input/output (I/O) device;
    maintain an interrupt pipe between the processor and the I/O device in a disabled state;
    detect a first interrupt signal from the I/O device to indicate that read data associated with the read request is available, and generate a second interrupt signal responsive to the first interrupt signal;
    issue a start command responsive to detection of the second interrupt signal; and
    enable the interrupt pipe and poll the I/O device for the data responsive to the start command.

11. The non-transitory computer readable storage medium of claim 10, wherein the I/O device is a human interface device.

12. The non-transitory computer readable storage medium of claim 10, wherein the I/O device is a sensor selected from: a touchpad, a touchscreen, an accelerometer, a gyrometer, a magnetometer, a global positioning system device, an ambient light sensor, a proximity sensor, a barometer, a hygrometer, a thermometer, and a real time clock device.

13. The non-transitory computer readable storage medium of claim 10, wherein the second interrupt signal is to be generated by a configuration logic of an I/O hub of the processor.

14. The non-transitory computer readable storage medium of claim 13, wherein the configuration logic is to generate the second interrupt signal in response to receipt of a general purpose input output interrupt from an I/O controller hub.

15. A computing platform, comprising:
    a processor including one or more cores and having a first hardware to:
        detect a read request, initiated by an application program, to read data from an input/output (I/O) device;
        pend the read request and maintain an interrupt pipe between the processor and the I/O device in a disabled state;

responsive to detection of a sideband interrupt to indicate that read data associated with the read request is available, issue a start command; and responsive to the start command, enable the interrupt pipe and poll the I/O device for the data;

a touchscreen; and a touchscreen controller to communicate touchscreen data to the processor, wherein the touchscreen data is indicative of a touchscreen coordinate in proximity to a touchscreen contact point by a user.

16. The computing platform of claim 15, wherein the I/O device is a sensor selected from: a touchpad, a magnetometer, a global positioning system device, and a real time clock device.

17. The computing platform of claim 15, wherein the I/O device is to communicate with the processor via a host-initiated communication transport in which data transfers are to be initiated by a kernel driver.

18. The computing platform of claim 17, wherein the host-initiated communication transport is a universal serial bus transport.

19. The computing platform of claim 15, wherein detection of the sideband interrupt comprises detection of an intermediate signal, indicative of the sideband interrupt, to be generated by a configuration logic of an I/O hub of the processor, and detection of a sideband interrupt deferral signal to be generated by a configuration kernel driver.

20. The computing platform of claim 19, wherein the configuration logic is to generate the intermediate signal in response to receipt of a general purpose input output interrupt from an I/O controller hub.

* * * * *